United States Patent
Kish et al.

(10) Patent No.: US 7,505,447 B2
(45) Date of Patent: Mar. 17, 2009

(54) SYSTEMS AND METHODS FOR IMPROVED DATA THROUGHPUT IN COMMUNICATIONS NETWORKS

(75) Inventors: William S. Kish, Saratoga, CA (US); John Chanak, Saratoga, CA (US); Charles Andrew Gram, Santa Clara, CA (US)

(73) Assignee: Ruckus Wireless, Inc., Sunnyvale, CA (US)

(*) Notice: Subject to any disclaimer, the term of this patent is extended or adjusted under 35 U.S.C. 154(b) by 69 days.

(21) Appl. No.: 11/232,196

(22) Filed: Sep. 20, 2005

(65) Prior Publication Data

US 2006/0098613 A1 May 11, 2006

Related U.S. Application Data

(60) Provisional application No. 60/625,331, filed on Nov. 5, 2004.

(51) Int. Cl.
H04J 3/24 (2006.01)
(52) U.S. Cl. .............. 370/349; 370/328; 370/338; 455/414.1; 455/456.3
(58) Field of Classification Search ........... 370/349, 370/328, 338; 455/414.1, 456.3
See application file for complete search history.

(56) References Cited

U.S. PATENT DOCUMENTS

| | | |
|---|---|---|
| 4,176,356 A | 11/1979 | Foster et al. |
| 4,193,077 A | 3/1980 | Greenberg et al. |
| 4,305,052 A | 12/1981 | Baril et al. |
| 4,814,777 A | 3/1989 | Monser |
| 5,173,711 A | 12/1992 | Takeuchi et al. |
| 5,220,340 A | 6/1993 | Shafai |
| 5,559,800 A | 9/1996 | Mousseau et al. |
| 5,754,145 A | 5/1998 | Evans |
| 5,767,809 A | 6/1998 | Chuang et al. |

(Continued)

FOREIGN PATENT DOCUMENTS

EP 0 534 612 3/1993

(Continued)

OTHER PUBLICATIONS

Dell Inc., "How Much Broadcast and Multicast Traffic Should I Allow in My Network," PowerConnect Application Note #5, Nov. 2003.

(Continued)

*Primary Examiner*—Nghi H Ly
(74) *Attorney, Agent, or Firm*—Carr + Ferrell LLP

(57) ABSTRACT

An access point of a communications network is disclosed configured to receive a multicast or broadcast packet from a source. The access point converts the multicast or broadcast packet into a unicast packet addressed to a station associated with the access point. The access point then transmits the unicast packet over the communications network from the access point to the station. The access point further may determine a minimum data rate by which the access point may transmit the multicast or broadcast packet to the station and determines an effective unicast rate for transmitting the unicast packet to the station. If the effective unicast rate does not exceed the minimum data rate, the access point does not transmit the unicast packet to the station and transmits the multicast or broadcast packet.

14 Claims, 3 Drawing Sheets

U.S. PATENT DOCUMENTS

| | | | |
|---|---|---|---|
| 5,802,312 A | 9/1998 | Lazaridis et al. | |
| 5,964,830 A | 10/1999 | Durett | |
| 6,034,638 A | 3/2000 | Thiel et al. | |
| 6,094,177 A | 7/2000 | Yamamoto | |
| 6,266,528 B1 | 7/2001 | Farzaneh | |
| 6,292,153 B1 | 9/2001 | Aiello et al. | |
| 6,307,524 B1 | 10/2001 | Britain | |
| 6,317,599 B1 | 11/2001 | Rappaport et al. | |
| 6,326,922 B1 | 12/2001 | Hegendoerfer | |
| 6,337,628 B2 | 1/2002 | Campana, Jr. | |
| 6,337,668 B1 | 1/2002 | Ito et al. | |
| 6,339,404 B1 | 1/2002 | Johnson et al. | |
| 6,345,043 B1 | 2/2002 | Hsu | |
| 6,356,242 B1 | 3/2002 | Ploussios | |
| 6,356,243 B1 | 3/2002 | Schneider et al. | |
| 6,356,905 B1 | 3/2002 | Gershman et al. | |
| 6,377,227 B1 | 4/2002 | Zhu et al. | |
| 6,392,610 B1 | 5/2002 | Braun et al. | |
| 6,404,386 B1 | 6/2002 | Proctor, Jr. et al. | |
| 6,407,719 B1 | 6/2002 | Ohira et al. | |
| 6,442,507 B1 | 8/2002 | Skidmore et al. | |
| 6,445,688 B1 | 9/2002 | Garces et al. | |
| 6,493,679 B1 | 12/2002 | Rappaport et al. | |
| 6,498,589 B1 | 12/2002 | Horii | |
| 6,499,006 B1 | 12/2002 | Rappaport et al. | |
| 6,507,321 B2 | 1/2003 | Oberschmidt et al. | |
| 6,625,454 B1 | 9/2003 | Rappaport et al. | |
| 6,674,459 B2 | 1/2004 | Ben-Shachar et al. | |
| 6,701,522 B1 | 3/2004 | Rubin et al. | |
| 6,725,281 B1 | 4/2004 | Zintel et al. | |
| 6,753,814 B2 | 6/2004 | Killen et al. | |
| 6,762,723 B2 | 7/2004 | Nallo et al. | |
| 6,779,004 B1 | 8/2004 | Zintel | |
| 6,819,287 B2 | 11/2004 | Sullivan et al. | |
| 6,876,280 B2 | 4/2005 | Nakano | |
| 6,888,504 B2 | 5/2005 | Chiang et al. | |
| 6,888,893 B2 | 5/2005 | Li et al. | |
| 6,892,230 B1 | 5/2005 | Gu et al. | |
| 6,906,678 B2 | 6/2005 | Chen | |
| 6,910,068 B2 | 6/2005 | Zintel et al. | |
| 6,924,768 B2 | 8/2005 | Wu et al. | |
| 6,931,429 B2 | 8/2005 | Gouge et al. | |
| 6,941,143 B2 | 9/2005 | Mathur | |
| 6,950,019 B2 | 9/2005 | Bellone et al. | |
| 6,961,028 B2 | 11/2005 | Joy et al. | |
| 6,973,622 B1 | 12/2005 | Rappaport et al. | |
| 6,975,834 B1 | 12/2005 | Forster | |
| 7,034,770 B2 | 4/2006 | Yang et al. | |
| 7,043,277 B1* | 5/2006 | Pfister | 455/566 |
| 7,050,809 B2 | 5/2006 | Lim | |
| 7,064,717 B2 | 6/2006 | Kaluzni et al. | |
| 7,085,814 B1 | 8/2006 | Gandhi et al. | |
| 7,089,307 B2 | 8/2006 | Zintel et al. | |
| 7,130,895 B2 | 10/2006 | Zintel et al. | |
| 7,171,475 B2 | 1/2007 | Weisman et al. | |
| 7,269,174 B2* | 9/2007 | Olson et al. | 370/395.31 |
| 2001/0055312 A1 | 12/2001 | Negus | |
| 2002/0031130 A1 | 3/2002 | Tsuchiya et al. | |
| 2002/0045435 A1 | 4/2002 | Fantaske | |
| 2002/0047800 A1 | 4/2002 | Proctor, Jr. et al. | |
| 2002/0080767 A1 | 6/2002 | Lee | |
| 2002/0084942 A1 | 7/2002 | Tsai et al. | |
| 2002/0105471 A1 | 8/2002 | Kojima et al. | |
| 2002/0112058 A1 | 8/2002 | Weisman et al. | |
| 2002/0114330 A1* | 8/2002 | Cheung et al. | 370/390 |
| 2002/0158798 A1 | 10/2002 | Chiang et al. | |
| 2002/0164963 A1* | 11/2002 | Tehrani et al. | 455/101 |
| 2002/0170064 A1* | 11/2002 | Monroe et al. | 725/105 |
| 2003/0026240 A1 | 2/2003 | Eyuboglu et al. | |
| 2003/0030588 A1 | 2/2003 | Kalis et al. | |
| 2003/0063591 A1 | 4/2003 | Leung et al. | |
| 2003/0122714 A1 | 7/2003 | Wannagot et al. | |
| 2003/0169330 A1 | 9/2003 | Ben-Shachar et al. | |
| 2003/0184490 A1 | 10/2003 | Raiman et al. | |
| 2003/0189514 A1 | 10/2003 | Miyano et al. | |
| 2003/0189521 A1 | 10/2003 | Yamamoto et al. | |
| 2003/0189523 A1 | 10/2003 | Ojantakanen et al. | |
| 2003/0210207 A1 | 11/2003 | Suh et al. | |
| 2003/0227414 A1 | 12/2003 | Saliga et al. | |
| 2004/0014432 A1 | 1/2004 | Boyle | |
| 2004/0017310 A1 | 1/2004 | Runkle et al. | |
| 2004/0017860 A1 | 1/2004 | Liu | |
| 2004/0027291 A1 | 2/2004 | Zhang et al. | |
| 2004/0027304 A1 | 2/2004 | Chiang et al. | |
| 2004/0032378 A1 | 2/2004 | Volman et al. | |
| 2004/0036651 A1 | 2/2004 | Toda | |
| 2004/0036654 A1 | 2/2004 | Hsieh | |
| 2004/0041732 A1 | 3/2004 | Aikawa et al. | |
| 2004/0048593 A1 | 3/2004 | Sano | |
| 2004/0058690 A1 | 3/2004 | Ratzel et al. | |
| 2004/0061653 A1 | 4/2004 | Webb et al. | |
| 2004/0070543 A1 | 4/2004 | Masaki | |
| 2004/0080455 A1 | 4/2004 | Lee | |
| 2004/0095278 A1 | 5/2004 | Kanemoto et al. | |
| 2004/0114535 A1 | 6/2004 | Hoffmann et al. | |
| 2004/0125777 A1 | 7/2004 | Doyle et al. | |
| 2004/0190477 A1 | 9/2004 | Olson et al. | |
| 2004/0260800 A1 | 12/2004 | Gu et al. | |
| 2005/0022210 A1 | 1/2005 | Zintel et al. | |
| 2005/0041739 A1 | 2/2005 | Li et al. | |
| 2005/0042988 A1 | 2/2005 | Hoek et al. | |
| 2005/0074108 A1 | 4/2005 | Zintel et al. | |
| 2005/0097503 A1 | 5/2005 | Zintel et al. | |
| 2005/0135480 A1 | 6/2005 | Li et al. | |
| 2005/0138137 A1 | 6/2005 | Encarnacion et al. | |
| 2005/0138193 A1 | 6/2005 | Encarnacion et al. | |
| 2005/0180381 A1 | 8/2005 | Retzer et al. | |
| 2005/0188193 A1 | 8/2005 | Kuehnel et al. | |
| 2005/0226239 A1 | 10/2005 | Nishida et al. | |
| 2005/0240665 A1 | 10/2005 | Gu et al. | |
| 2005/0267935 A1 | 12/2005 | Ghandi et al. | |
| 2006/0094371 A1 | 5/2006 | Nguyen | |
| 2006/0098605 A1 | 5/2006 | Li | |
| 2006/0098607 A1 | 5/2006 | Zeng et al. | |
| 2006/0123124 A1 | 6/2006 | Weisman et al. | |
| 2006/0123125 A1 | 6/2006 | Weisman et al. | |
| 2006/0123455 A1 | 6/2006 | Pai et al. | |
| 2006/0165029 A1 | 7/2006 | Melpignano et al. | |
| 2006/0168159 A1 | 7/2006 | Weisman et al. | |
| 2006/0184661 A1 | 8/2006 | Weisman et al. | |
| 2006/0184693 A1 | 8/2006 | Rao et al. | |
| 2006/0187660 A1 | 8/2006 | Rao et al. | |
| 2006/0224690 A1 | 10/2006 | Falkenburg et al. | |
| 2006/0225107 A1 | 10/2006 | Seetharaman et al. | |
| 2006/0227761 A1 | 10/2006 | Scott, III et al. | |
| 2006/0239369 A1 | 10/2006 | Lee | |
| 2006/0268881 A1 | 11/2006 | Moreton | |
| 2006/0291434 A1 | 12/2006 | Gu et al. | |
| 2007/0027622 A1 | 2/2007 | Cleron et al. | |
| 2007/0135167 A1 | 6/2007 | Liu | |

FOREIGN PATENT DOCUMENTS

| | | |
|---|---|---|
| EP | 1 315 311 | 5/2003 |
| EP | 1 1450 521 | 8/2004 |
| JP | 08-088633 | 2/1996 |
| JP | 2001-057560 | 2/2002 |
| JP | 2005-354249 | 12/2005 |
| JP | 2006-060408 | 3/2006 |

| | | |
|---|---|---|
| WO | WO 02/25967 | 3/2002 |
| WO | WO 03/079484 | 9/2003 |

OTHER PUBLICATIONS

Toskala, Antti, "Enhancement of Broadcast and Introduction of Multicast Capabilities in RAN," Nokia Networks, Palm Springs, California, Mar. 13-16, 2001.

Microsoft Corporation, "IEEE 802.11 Networks and Windows XP," Windows Hardware Developer Central, Dec. 4, 2001.

Festag, Andreas, "What is MOMBASA?" Telecommunication Networks Group (TKN), Technical University of Berlin, Mar. 7, 2002.

Hewlett Packard, "HP ProCurve Networking: Enterprise Wireless LAN Networking and Mobility Solutions," 2003.

Dutta, Ashutosh et al., "MarconiNet Supporting Streaming Media Over Localized Wireless Multicast," Proc. of the 2d Int'l Workshop on Mobile Commerce, 2002.

Dunkels, Adam et al., "Making TCP/IP Viable for Wireless Sensor Networks," Proc. of the 1st Euro. Workshop on Wireless Sensor Networks, Berlin, Jan. 2004.

Dunkels, Adam et al., "Connecting Wireless Sensornets with TCP/IP Networks," Proc. of the 2d Int'l Conf. on Wired Networks, Frankfurt, Feb. 2004.

Cisco Systems, "Cisco Aironet Access Point Software Configuration Guide: Configuring Filters and Quality of Service," Aug. 2003.

Hirayama, Koji et al., "Next-Generation Mobile-Access IP Network," Hitachi Review vol. 49, No. 4, 2000.

Ken Tang, et al., "MAC Layer Broadcast Support in 802.11 Wireless Networks," Computer Science Department, University of California, Los Angeles, 2000 IEEE, pp. 544-548.

Ken Tang, et al., "MAC Reliable Broadcast in Ad Hoc Networks," Computer Science Department, University of California, Los Angeles, 2001 IEEE, pp. 1008-1013.

Vincent D. Park, et al., "A Performance Comparison of the Temporally-Ordered Routing Algorithm and Ideal Link-State Routing," IEEE, Jul. 1998, pp. 592-598.

Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology.

Wennstrom, Mattias et al., "Transmit Antenna Diversity in Ricean Fading MIMO Channels with Co-Channel Interference," 2001.

Mawa, Rakesh, "Power Control in 3G Systems," Hughes Systique Corporation, Jun. 28, 2006.

Chang, Nicholas B. et al., "Optimal Channel Probing and Transmission Scheduling for Opportunistics Spectrum Access," Sep. 2007.

Steger, Christopher et al., "Performance of IEEE 802.11b Wireless LAN in an Emulated Mobile Channel," 2003.

Pat Calhoun et al., "802.11r strengthens wireless voice," Technology Update, Network World, Aug. 22, 2005, http://www.networkworld.com/news/tech/2005/082208techupdate.html.

Areg Alimian et al., "Analysis of Roaming Techniques," doc.:IEEE 802.11-04/0377r1, Submission, Mar. 2004.

Information Society Technologies Ultrawaves, "System Concept / Architecture Design and Communication Stack Requirement Document," Feb. 23, 2004.

Golmie, Nada, "Coexistence in Wireless Networks: Challenges and System-Level Solutions in the Unlicensed Bands," Cambridge University Press, 2006.

* cited by examiner

SYSTEMS AND METHODS FOR IMPROVED DATA THROUGHPUT IN COMMUNICATIONS NETWORKS

CROSS-REFERENCE TO RELATED APPLICATION

This application claims the benefit of U.S. Provisional Patent Application No. 60/625,331 entitled "Systems and Methods for Improved Data Throughput in Wireless Local Area Networks," filed on Nov. 5, 2004, the subject matter of which are hereby incorporated by reference. This application is related to co-pending U.S. patent application Ser. No. 11/010,076 entitled "System and Method for an Omnidirectional Planar Antenna Apparatus with Selectable Elements," filed on Dec. 9, 2004, U.S. patent application Ser. No. 11/022,080 entitled "Circuit Board Having a Peripheral Antenna Apparatus with Selectable Antenna Elements," filed on Dec. 23, 2004, and U.S. patent application Ser. No. 11/041,145 entitled "System and Method for a Minimized Antenna Apparatus with Selectable Elements," filed on Jan. 21, 2005, the subject matter of which are hereby incorporated by reference.

BACKGROUND

1. Field of the Invention

The present invention relates generally to communications networks and more particularly to systems and methods for increased data throughput in communications networks.

2. Description of the Prior Art

Demand for multimedia applications, including audio and video data, is rapidly increasing. Some of the more popular uses of multimedia are real-time interactive applications, such as video and audio streaming, Internet Protocol TV (IPTV), transmission of lectures or speeches to a remote audience, and animated simulations. Even when data compression is used, multimedia applications require large amounts of bandwidth.

In an IEEE 802.11 wireless local area network (LAN), broadcast, or multicast packet transmission enables bandwidth-intensive multimedia applications to simultaneously transmit audio and video data packets to each receiving node associated with a group of the wireless LAN. Broadcast packets are transmitted to all receiving nodes of the wireless LAN, whereas multicast packets are transmitted to two or more, but fewer than all, of the receiving nodes of the wireless LAN.

In the wireless LAN, a source node may transmit (e.g., via Ethernet) multicast packets to a multicast-enabled access point, and the access point sends the multicast packets via wireless transmission to destination receiving nodes that have identified themselves as part of the multicast group.

The access point of the wireless LAN may also support unicast packet transmission. For unicast transmission in the wireless LAN, the access point transmits one or more unicast packets to the receiving node identified by an intended destination address included in the unicast packets. After receiving the unicast packet, the receiving node transmits (approximately 9 µs later) an 802.11 acknowledgement (ACK) packet back to the access point. The 802.11 ACK mechanism provides reliable data transmission in the typically highly interfered 802.11 wireless network by confirming to the access point that the unicast packet was received.

A limitation with transmitting multicast packets in the wireless LAN is that the 802.11 ACK does not provide a reliable mechanism for ensuring that the receiving nodes actually received the multicast packets. For example, if the 802.11 access point were to transmit one or more multicast packets to a number of receiving nodes, and each of the receiving nodes were to respond essentially simultaneously with 802.11 ACK packets, the multiple ACK packets received by the access point would comprise "noise" during the period of the multiple simultaneous 802.11 ACKs. To the access point, these multiple simultaneous 802.11 ACKs are undecipherable. This condition may be referred to as a "multiple ACK problem."

Another limitation with transmitting multicast packets is that the wireless LAN may be limited in the bandwidth used for multicast packets. Because of the multiple ACK problem, the IEEE 802.11 specification for multicast dictates that transmission of multicast packets occur at a minimum allowable physical data rate. Because the receiving nodes may be at various distances from the source of the transmission, and may experience various interference levels, transmitting at the minimum allowable physical data rate improves the probability of reception of the multicast packets by each receiving node. For example, an 802.11 access point transmits multicast packets at a minimum allowable physical data rate of 1 Mbps for 802.11b and 6 Mbps for 802.11a. The receiving nodes do not transmit 802.11 ACK packets to verify reception of the multicast packets. Thus, without the 802.11 ACK mechanism, there is no verification of reception of the multicast packets.

Further, transmitting at the minimum allowable physical data rate under-utilizes available bandwidth in the wireless LAN, which otherwise is capable of supporting much higher data rates. In addition, transmitting at the minimum allowable physical data rate may make the wireless LAN unsuitable for applications that require high rate communication, such as multimedia applications.

SUMMARY OF THE INVENTION

The invention addresses the above problems by providing systems and methods for improved data throughput in communications networks. An access point of a communications network of one embodiment receives a multicast or broadcast packet from a source. The access point converts the multicast or broadcast packet into a unicast packet addressed to a station associated with the access point. The access point then transmits the unicast packet over the communications network from the access point to the station. By converting the multicast or broadcast packet into one or more unicast packets, the access point achieves improved data throughput in the communications network by sending the unicast packet at higher data rate than would otherwise be possible by transmitting the multicast or broadcast packet to the station. Additionally, the unicast packet provides for reliable delivery of data in the multicast or broadcast packet in communications networks where the unicast packet is acknowledged.

In some embodiments, the communication network comprises an 802.11 wireless network. The access point may determine the station from a list of one or more stations associated with the access point. The access point may determine a minimum data rate by which the access point may transmit the multicast or broadcast packet to the station and determine an effective unicast rate for transmitting the unicast packet to the station. The access point then may not transmit the unicast packet to the station and may transmit the multicast or broadcast packet to the station if the effective unicast rate does not exceed the minimum data rate.

The access point may also determine an antenna configuration on which to transmit to the station and determine a physical data rate at which to transmit to the station. The access point then may transmit the unicast packet on the antenna configuration and at the physical data rate over a wireless network from the access point to the station. In still further embodiments, the access point determines that the station acts as the source and does not transmit the unicast packet to the station. The access point may query the station to determine an address for the station and may map an address of the multicast or broadcast packet to the address of the station. The access point may also associate the station to an address of the multicast or broadcast packet based on a join request transmitted from the station to the source.

A method is provided comprising receiving into an access point a multicast or broadcast packet from a source and converting the multicast or broadcast packet into a unicast packet addressed to station associated with the access point. The method also includes transmitting the unicast packet over the communications network from the access point to the station. The multicast or broadcast packet may comprise a User Datagram Protocol (UDP) networking message. The multicast or broadcast packet may also comprise a multicast control packet.

An alternative method comprises receiving into an access point of a communications network a multicast or broadcast packet from a source, determining a first rate by which the access point may transmit the multicast or broadcast packet to a first station associated with the access point, determining a second rate by which the access point may transit the multicast or broadcast packet to a second station associated with the access point, and transmitting the multicast or broadcast packet to the first station and the second station at the lower of the first rate and the second rate. Advantageously, the access point may determine a higher data rate than a minimum physical data rate specified for the communications network at which the access point may transmit the multicast or broadcast packet to the first station and the second station.

A first node of a communication network, in one embodiment, for transmitting to a second node of the communication network is configured to determine a first rate for transmitting a multicast or broadcast packet. The first node also determines a second rate for transmitting to the second node one or more unicast packets resulting from conversion of the multicast or broadcast packet into the one or more unicast packets. The first node then transmits the one or more unicast packets to the second node if the second data rate exceeds the first data rate and otherwise transmits the multicast or broadcast packet to the second node.

Advantageously, the first node converts the multicast or broadcast packet, when appropriate, to one or more unicast packets and transmits the one or more unicast packets sequentially to the second node at a higher data rate than the minimum physical data rate specified for multicast or broadcast transmission. The first node may comprise a multicast-enabled access point. In some embodiments, the first node determines a third rate by which the first node may transmit the multicast or broadcast packet to a third node of the communications network and transmits over the communications network the multicast or broadcast packet to the second node and the third node at the lower of the first rate and the third rate.

Therefore, the systems and methods may provide reliable transmission of the multicast or broadcast packet over the wireless LAN by converting the multicast or broadcast packet to the one or more unicast packets and servicing corresponding acknowledgement packets from the station. A further advantage is that the systems and methods may determine not to convert the multicast or broadcast packet, and may transmit the multicast or broadcast packet over the wireless LAN at a higher data rate than the minimum physical data rate that the station may reliably receive.

DETAILED DESCRIPTION

The systems and methods disclosed herein enable data throughput in communication networks greater than that which is provided in the prior art. For example, the system and method disclosed herein support bandwidth-intensive multimedia applications over wireless LANs. In the disclosure, nodes of a communication network may be referred to as a host, a source, a destination, a node, a receiving node, an access point, and a station. The references should not be considered in a limiting sense, as it is understood that the present invention is in no way limited to only the embodiments illustrated. For example, a "receiving node" is in no way limited to the function of receiving only. Additionally, the term group packet includes a multicast packet, a broadcast packet, and any packet whose destination address indicates one or more addresses and/or nodes of the communications network.

According to one embodiment, a wireless local area network (LAN) comprises an access point configured to receive a multicast or broadcast packet from a source. The multicast or broadcast packet is addressed to a group comprising one or more nodes of a communications network (e.g., stations associated with the access point of the wireless LAN). The access point determines whether to convert the multicast or broadcast packet into one or more unicast packets for sequential transmission to the one or more nodes or whether to transmit the multicast or broadcast packet to the group. If the access point transmits the multicast or broadcast packet without conversion, the access point may determine a lowest common denominator data rate based on data rates for transmitting multicast or broadcast packets to the one or more nodes and transmits the multicast or broadcast packet to the group at the lowest common denominator rate.

Figure 1:
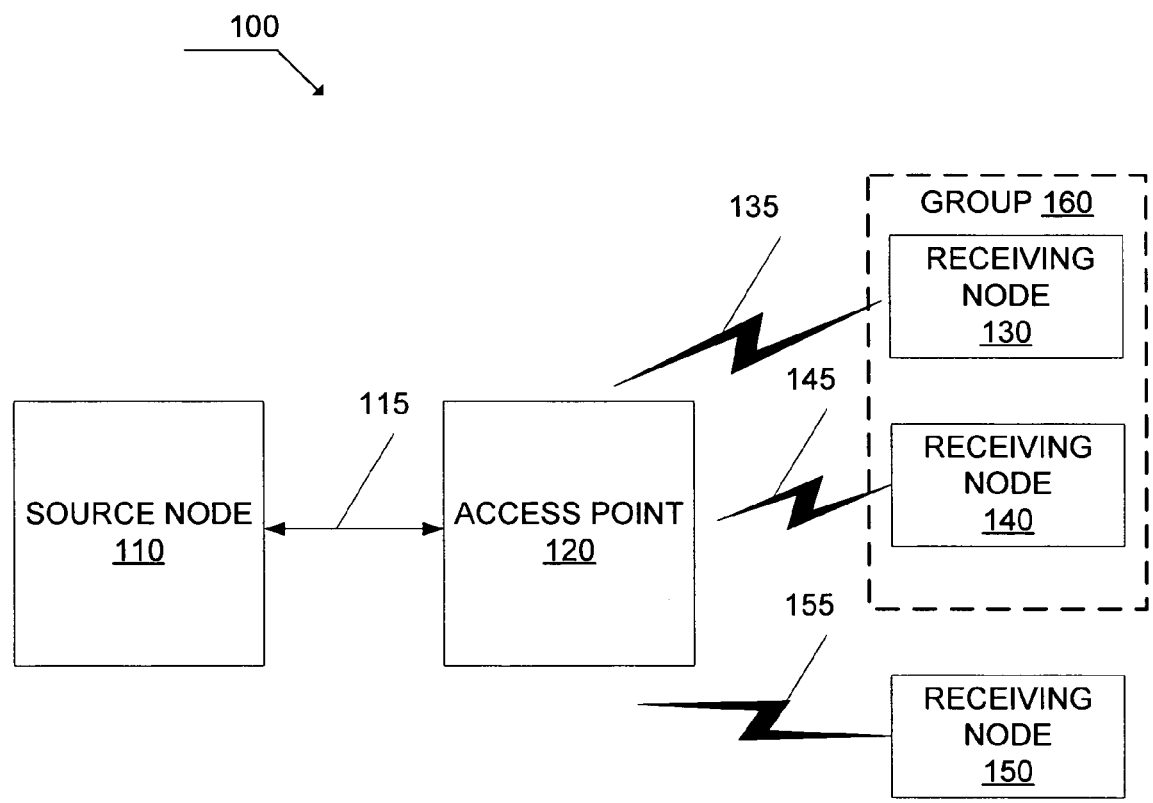
FIG. 1 illustrates a block diagram of a system for multicast transmission in a wireless local area network, in accordance with one embodiment of the present invention.

FIG. 1 illustrates a block diagram of a system 100 for multicast packet transmission in a wireless local area network, in accordance with one embodiment of the present invention. The system 100 comprises a source node 110, a network link 115, an access point 120, receiving nodes 130, 140, and 150, wireless links 135, 145, and 155, and a group 160 comprising two or more of the receiving nodes (e.g., the receiving nodes 130 and 140). The source node 110 is configured to communicate with the access point 120 over the network link 115. The access point 120 is configured to communicate with the receiving nodes 130-150 over the wireless links 135-155 that form the wireless LAN.

The source node 110 is any device capable of network communication including unicast or multicast packet transmission with the access point 120 over the network link 115.

The source node 110 may comprise, for example, a personal computer, a server, a network attached storage device, or a network video distribution device. The source node 110 may support networking protocols such as Transmission Control Protocol/Internet Protocol (TCP/IP), User Datagram Protocol (UDP/IP), and/or Internet Group Management Protocol (IGMP), and may support unicast, multicast, and/or broadcast packet transmission of network data.

The source node 110 is configured to transmit one or more group packets addressed to the group 160 (e.g., one or more multicast or broadcast packets) over the network link 115. The network link 115 may be a wired or wireless network link. In one embodiment, the network link 115 comprises a UDP/IP connection. In one example, the source node 110 comprises an IPTV video server (not shown) that transmits the multicast packets, providing a remote video stream to the group 160 through the access point 120. Although discussed in regard to multicast transmission, the group packets may comprise a packet whose destination address specifies all (i.e., broadcast), or less than all (i.e., multicast) of the receiving nodes 130-150.

The receiving nodes 130-150 each comprise any device capable of receiving network communication from the source node 110 through the access point 120 over the wireless links 135-155. The receiving nodes 130-150 may comprise devices such as personal computers, PDAs, cell phones, and/or internet enabled televisions. In one example, the receiving nodes 130-140 of the group 160 may comprise TV set-top boxes configured to receive a video stream provided by the IPTV server at the source node 110 to the group 160. Although described as the source node 110 and the receiving nodes 130-150, it should be noted that the source node 110 may also be the destination node of a data packet as well as the receiving nodes 130-150 may also be the source node of a data packet.

As described further herein, the access point 120 is configured to transmit the video stream to the receiving node 130 and the receiving node 140 either simultaneously as a multicast packet, or sequentially as one or more unicast packets to each of the receiving nodes 130 and 140. The access point 120 is virtually any device capable of acting as a bridge in a peer-to-peer connection in the wireless LAN or as a bridge between the network link 115 and the wireless links 135-155. The access point 120 may be configured to convert the multicast packet into one or more unicast packets, as discussed further with respect to FIG. 2. The access point 120 may include a processor, a memory, and additional circuitry that provides or assists in providing the bridge and/or the multicast packet conversion. The access point 120 may use the IEEE 802.11 protocol, such as 802.11a or 802.11b, to communicate with the receiving nodes 130-150. It will be appreciated that the access point 120 may incorporate other wireless protocols, such as 802.11g, 802.16, or Bluetooth.

The access point 120 may support multicast control protocols, such as IGMP, and may be configured as a multicast-enabled router. A multicast control protocol enables the access point 120 to determine from the receiving nodes (e.g., the receiving nodes 130-150) which group(s) (e.g., the group 160) the receiving nodes 130-150 are associated with. Some examples of multicast control protocols are IGMP, Protocol-Independent Multicast (PIM), Real-Time Streaming Protocol (RTSP), Multiprotocol Border Gateway Protocol (MBGP), Multicast Source Discovery Protocol (MSDP), Simple Service Discovery Protocol (SSDP), and Source Specific Multicast (SSM). For example, the receiving node 130 may send a multicast control protocol packet to the access point 120 to change the channel for an IPTV multicast stream received from the source node 110. The multicast control protocol packet informs the access point 120 that the receiving node 130 is interested in receiving group packets for the selected channel.

The access point 120 of some embodiments is further configured to maintain information about "associated nodes." Associated nodes are devices that have negotiated a wireless communication link (e.g., the wireless link 135) with the access point 120. For example, when the receiving node 130 initially associates with the access point 120 to negotiate the wireless link 135, the receiving node 130 provides a Media Access Control (MAC) or hardware address that uniquely identifies the receiving node 130. The receiving node 130 may also provide a list of allowable physical data rates (e.g., 1 Mbps-54 Mbps) at which it may communicate with the access point 120. The access point 120 may store such information about the associated nodes in memory, for example.

As described further herein, the system 100 improves multicast data throughput in the wireless LAN because the access point 120 of one embodiment is configured to convert the multicast packet addressed to the group 160 into one or more unicast packets addressed to the receiving nodes 130-140. The access point 120 may transmit the one or more unicast packets sequentially to the receiving nodes 130-140 at a higher data rate than the minimum data rate used for 802.11 multicast transmission. Further, the access point 120 of this embodiment would ensure reliable transmission of the converted multicast packet because the access point 120 would be able to service 802.11 ACK packets generated by the receiving nodes 130-140. In some embodiments, the access point 120 may determine not to convert the multicast packet into one or more unicast packets, but instead may transmit the multicast packet to the receiving nodes of the group 160 at a relatively higher data rate than the minimum allowable physical data rate used for 802.11 multicast packet transmission.

Figure 2:
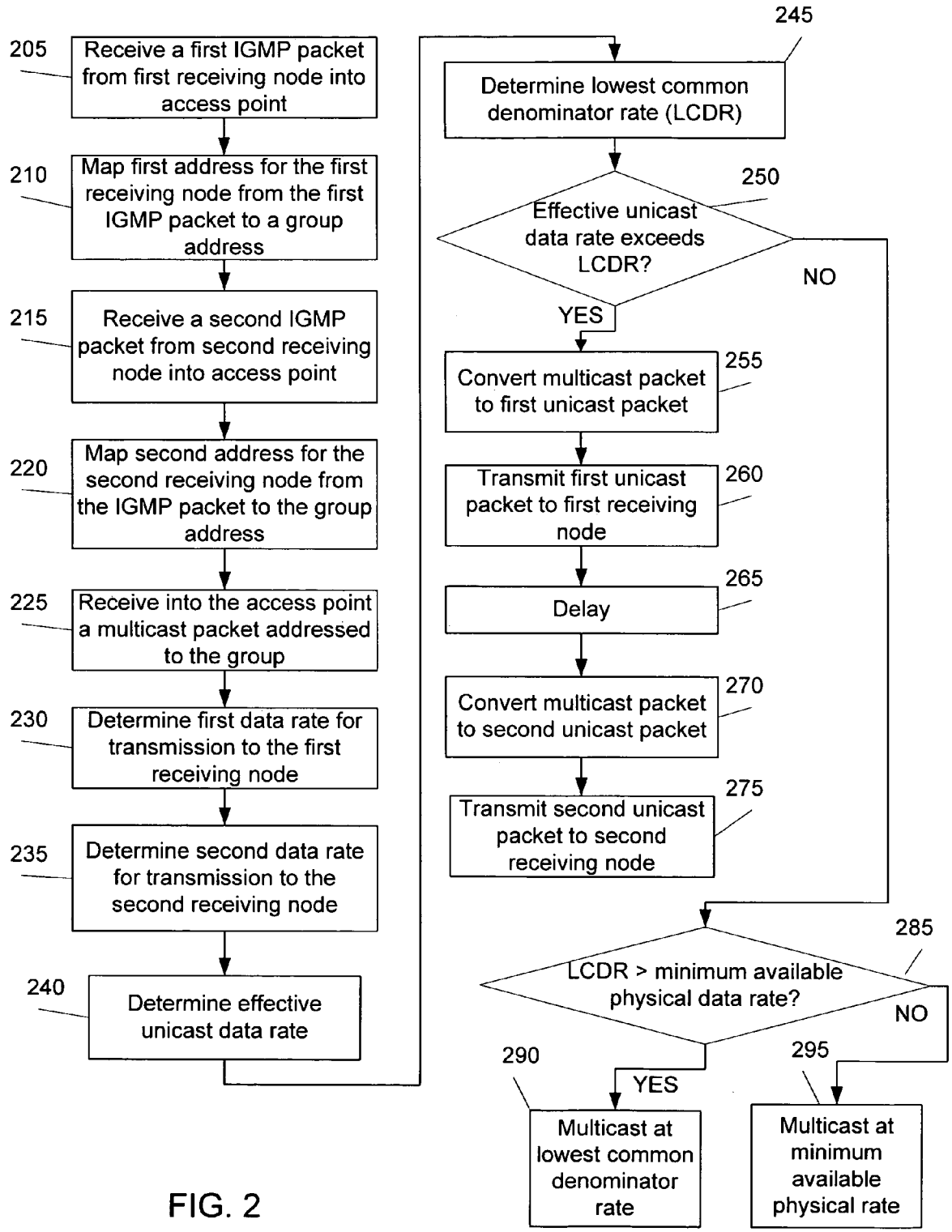
FIG. 2 illustrates an exemplary method for multicast or unicast transmission in the wireless local area network of FIG. 1, in accordance with one embodiment of the present invention.

FIG. 2 illustrates an exemplary method for multicast or unicast transmission in the wireless local area network of FIG. 1, in accordance with one embodiment of the present invention. The steps of the exemplary method are described as occurring in particular order, but it will be appreciated that certain steps may be rearranged to provide a similar result. The method determines whether to convert a multicast packet into one or more unicast packets or whether to transmit the multicast packet. The method also determines at what rate to transmit the multicast packet and the one or more unicast packets. The method begins with the access point 120 already associated with receiving nodes 130-150.

In step 205, the access point 120 receives a first join request (e.g., a multicast control protocol packet such as an IGMP join request) from the first receiving node (e.g., the receiving node 130) containing a first address for the receiving node 130. The access point 120 uses the join request to correlate the receiving node 130 with the address of the group 160. In IGMP, a multicast client (e.g., the receiving node 130) joins a multicast group (e.g., the group 160) to enable group reception of a multicast traffic stream. When the access point 120 receives the IGMP join request from the receiving node 130, the access point 120 inspects the IGMP packet and determines the required join information.

In this embodiment, the access point 120 does not itself use the IGMP protocol. Regardless, the system 100 takes advantage of the fact that the IGMP join requests from the receiving nodes 130-140 to the source node 110 pass through the access point 120. The access point 120 "sniffs" or samples the IGMP join requests to map the hardware (MAC) address of the receiving nodes 130 and 140 with the address of the group 160. In some embodiments, the access point 120 "speaks" the IGMP protocol. The access point 120 may map the IP addresses (instead of the MAC addresses) of the receiving nodes 130 and 140 to the address of the group 160.

In the alternative to sniffing or speaking IGMP or other control protocols from the receiving nodes 130-150, the access point 120 may maintain a map that contains the hardware addresses of all or a subset of the receiving nodes 130-150 that are associated with the access point 120. The access point 120 may use the map to query the receiving nodes 130-150 to determine which of the receiving nodes 130-150 are interested in receiving multicast traffic addressed to the group 160. These maps of MAC addresses or IP addresses allow the access point 120 to convert the multicast packet received from the source node 110 and addressed to the group 160 into one or more unicast packets addressed to the receiving nodes 130-140 of the group 160.

In step 210, the access point 120 maps the first address of the receiving node 130 from the IGMP packet to the address of the group 160. In step 215, the access point 120 receives a second join request (e.g., a second IGMP join request) from a second receiving node (e.g., the receiving node 140). In step 220, the access point 120 maps a second address of the receiving node 140 to the address of the group 160.

In step 225, the access point 120 receives the multicast packet addressed to the group 160. In step 230, the access point 120 determines a first data rate (e.g., 54 Mbps) by which the access point 120 may reliably transmit (e.g., including the 802.11 ACK mechanism) one or more unicast packets to the receiving node 130. In step 235, the access point 120 determines a second data rate (e.g., 24 Mbps) by which the access point 120 may reliably transmit one or more unicast packets to the receiving node 140. Although not depicted, in some embodiments the access point 120 may determine additional (e.g., a third or more) data rates by which the access point 120 may reliably transmit one or more unicast packets to a third receiving node (e.g., the receiving node 150 which would be part of the group 160).

In step 240, the access point 120 determines an effective unicast rate. As discussed further with respect to FIG. 3, the effective unicast rate corresponds to a combined rate for converting the multicast packet into one or more unicast packets and sending the one or more unicast packets to the receiving nodes 130 and 140 of the group 160 at the first and second (and third . . . ) data rates. The effective unicast rate depends on the total number of bits included in the unicast packets, including additional data packet overhead (e.g., additional bits in the unicast packet as compared to the multicast packet). The effective unicast rate also depends on computational time associated with converting the multicast packet into one or more unicast packets. The effective unicast rate is further based on the duration for reception and processing of ACK packets from the receiving nodes of the group 160. Further, the effective unicast rate is based on the number of receiving nodes in the group 160, because each additional receiving node in the group 160 proportionally lowers the effective unicast rate. One method for determining the effective unicast rate is presented in co-pending U.S. patent application entitled "System and Method for Transmission Parameter Control for an Antenna Apparatus with Selectable Elements," the subject matter of which is hereby incorporated by reference.

As described further, rather than converting the multicast packet to unicast packets, the access point may transmit at a "lowest common denominator rate" to the group 160. For example, the lowest common denominator rate may be higher than the effective unicast rate, particularly with a large number of receiving nodes in the group 160 each receiving at a relatively high rate. For example, the group 160 may comprise the receiving nodes 130, 140, and 150. The receiving node 130 may receive packets at a physical data rate of 54 Mbps, the receiving node 140 may receive packets at a physical data rate of 54 Mbps, and the receiving node 150 may receive packets at a physical data rate of 54 Mbps. The lowest common denominator rate for this example is 54 Mbps, which may be higher than the effective unicast rate. In step 245, the access point 120 determines the lowest common denominator rate (LCDR) for transmitting the multicast packet simultaneously to the receiving nodes of the group 160.

In steps 250-295, the access point 120 determines whether to transmit unicast or multicast packets, and at what rate to transmit the unicast or multicast packets. Specifically, in steps 250-275, the access point 120 may determine to convert the multicast packet into one or more first unicast packets addressed to the receiving node 130 and one or more second unicast packet addressed to the receiving node 140 for transmission. Alternatively, in steps 285-295, the access point 120 may determine to transmit the multicast packet simultaneously to the receiving nodes 130-140 of the group 160 and not convert the multicast packet into unicast packets. Further, in steps 285-295 the access point 120 determines whether to transmit at the lowest common denominator rate if the lowest common denominator rate is higher than the minimum allowable physical data rate.

In step 250, the access point 120 determines if the effective unicast rate exceeds the lowest common denominator rate. For example, in an 802.11a wireless LAN with the receiving nodes 130, 140, and 150 in the group 160, the first data rate may be 54 Mbps, the second data rate may be 6 Mbps, and the third data rate may be 54 Mbps. The effective unicast rate, given the number of data bits in the unicast packets, packet overhead, conversion processing time, and the like may be 11.5 Mbps, for example. Accordingly, the effective unicast rate of 11.5 Mbps exceeds the lowest common denominator rate of 6 Mbps (i.e., the minimum allowable physical data rate for 802.11a), so the access point 120 will convert the multicast packet into one or more unicast packets in steps 255-275.

In step 255, the access point 120 converts the multicast packet to a first unicast packet addressed to the receiving node 130. In step 260, the access point 120 transmits the first unicast packet to the receiving node 130 at the first data rate. After transmission of the first unicast packet, in step 265 the access point 120 may delay for a predetermined delay period before converting the multicast packet into a second unicast packet and transmitting the second unicast packet to the receiving node 140 in steps 270-275. The delay period is computed to allow the receiving node 130 sufficient time to generate an 802.11 ACK that the access point 120 may receive to verify reliable transmission and reception of the first unicast packet. The access point 120 may compute the delay period based on several factors. For example, the access point 120 may compute the delay based on computational time needed by the access point 120 to convert the multicast packet into the first unicast packet. The delay may include data packet overhead (e.g., additional bits in the first unicast packet that reduce the first data rate to a relatively lower "user" data rate). Further, the access point 120 may retransmit the first unicast packet to the receiving node 130 if the access point 120 does not receive the 802.11 ACK from the receiving node 130 for the first unicast packet, adding to the delay.

In step 270, the access point 120 converts the multicast packet from the source node 110 into a second unicast packet addressed to the receiving node 140. In step 275, the access point 120 transmits the second unicast packet at the second data rate to the receiving node 140. In similar fashion to the method described above with respect to steps 260-265 for the first unicast packet, the access point 120 awaits an 802.11 ACK from the receiving node 140 to ensure reliable transmission and reception of the second unicast packet. The access point 120 may retransmit the second unicast packet to the receiving node 140 if the access point 120 does not receive the 802.11 ACK from the receiving node 140. Although not depicted, the steps 265 to 275 may be repeated for additional (e.g., third . . . ) receiving nodes in the group 160.

Optionally, the access point 120 may determine in step 260 and step 275 whether one of the receiving nodes of the group 160 comprises a multicast data transmitter. For example, if the receiving node 130 acts as the source node 110 for sending the multicast packet through the access point 120 to the receiving nodes 140 and 150 of the group 160, the access point 120 need not retransmit the converted unicast packet back to the receiving node 130. Although sending the unicast packet back to the receiving node 130 is legitimate practice in 802.11, doing so wastes network bandwidth.

At step 250, if the effective unicast rate does not exceed the lowest common denominator rate, the access point 120 may determine not to convert the multicast packet into one or more unicast packets for sequential transmission to each receiving node in the group 160. Accordingly, in step 285, the access point 120 determines whether the LCDR exceeds the minimum allowable data rate. For example, if the receiving node 130 is capable of receiving at 54 Mbps and the receiving node 140 is capable of receiving at 24 Mbps, the LCDR of 24 Mbps exceeds the minimum allowable data rate of 6 Mbps. Accordingly, in step 290 the access point 120 will transmit the multicast packet to the group 160 at the LCDR of 24 Mbps. Alternatively, at step 285 if the receiving node 130 is capable of receiving at 54 Mbps and the receiving node 140 is capable of receiving at only 6 Mbps, for example, the LCDR does not exceed the minimum allowable data rate of 6 Mbps. Accordingly, in step 295, the access point 120 will transmit the multicast packet to the group 160 at the minimum allowable data rate of 6 Mbps.

The methods described with respect to FIG. 2 advantageously achieve higher data throughput than traditional multicast transmission, by converting multicast packets in the access point 120 into one or more unicast packets that may be transmitted sequentially to each receiving node of the group 160 at a relatively higher data rate. Further, converting the multicast packet into unicast packets affords higher data transmission reliability because the unicast packets are verified by ACK responses from each receiving node of the group 160. Additionally, if the access point 120 determines not to convert multicast packets into unicast packets, the access point 120 may transmit the multicast packet at the lowest common denominator rate, which is a higher physical data rate than the minimum allowable physical data rate defined in the IEEE 802.11 standard.

Although FIGS. 1 and 2 generally describe multicast data flow from the source node 110 to the group 160 (i.e., left to right in FIG. 1), the methods described with respect to FIG. 2 are applicable to multicast control protocol packets that flow in the opposite direction (e.g., from right to left in FIG. 1). For example, the system 100 may include a source node (e.g., the receiving node 130) configured to transmit a group packet to a destination node (e.g., the access point 120). The receiving node 130 sends a multicast control protocol packet, such as an IGMP join request, over the wireless link 135 to the access point 120 to join a group (e.g., group 160) receiving an IPTV multimedia multicast stream. To provide more effective use of the available bandwidth of the wireless link 135, and to provide reliable transmission of the multicast control protocol packet, the receiving node 135 may convert the multicast control protocol packet to one or more unicast packets for transmission to and acknowledgement by the access point 120.

In one example, the receiving node 130 determines a first data rate for transmitting the group packet and determines a second data rate based upon converting the group packet to a unicast packet addressed to the access point 120. The receiving node 130 transmits the unicast packet at the second data rate through the wireless link 135 to the access point 120 if the first data rate for transmitting the group packet is less than the second data rate for transmitting the unicast packet. As discussed herein, the receiving node 130 transmits the unicast packet at a higher physical data rate than specified for multicast transmission. Upon receipt of the unicast packet, the access point 120 sends an ACK to acknowledge receipt of the unicast packet.

If the first data rate for transmitting the group packet is greater than the second data rate for transmitting the unicast packet, the receiving node 130 may transmit the group packet through the wireless link 135. As previously discussed, the receiving node 130 may transmit the group packet at the lowest common denominator rate. The access point 120 then receives the group packet and processes the multicast control protocol packet. Therefore, in these embodiments, the receiving node 130 and the access point 120 individually determine whether transmitting the group packet or converting the group packet to one or more unicast packets allows more effective use of the available bandwidth and reliable transmission.

Figure 3:
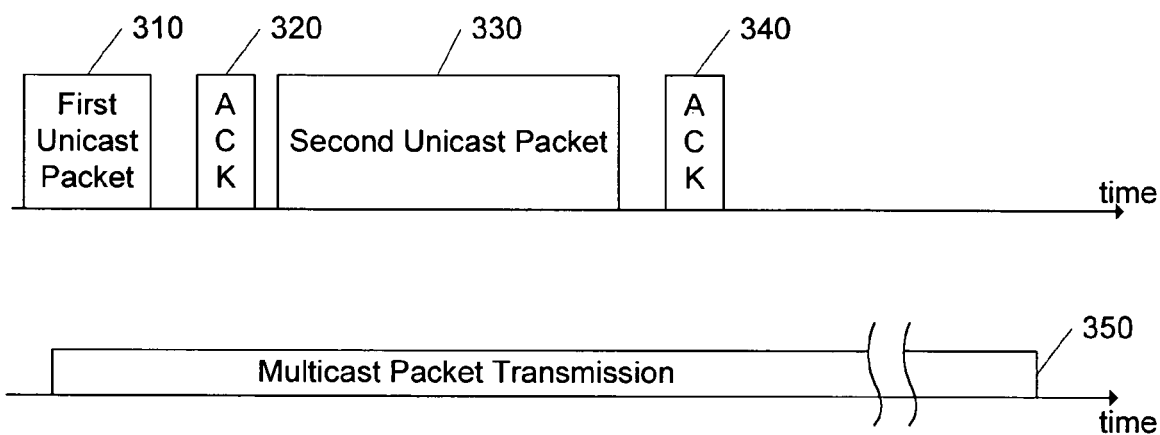
FIG. 3 illustrates an exemplary timing diagram illustrating conversion of multicast packets into unicast packets as described with respect to FIGS. 1-2, in accordance with one embodiment of the present invention.

FIG. 3 illustrates an exemplary timing diagram comparing the conversion of the multicast packet into one or more unicast packets, as described in FIGS. 1-2, as compared to multicast packet transmission, in accordance with one embodiment of the present invention. A first time interval 310 indicates the time needed for the access point 120 to convert the multicast packet received from the source node 110 into the first unicast packet and transmit the first unicast packet to the receiving node 130, for example, at 54 Mbps. It will be appreciated that the time interval 310 may vary depending upon at least the first data rate, the number of data bits in the first unicast packet, and the conversion time needed by the access point 120 to convert the multicast packet into the first unicast packet. After the first unicast packet is transmitted to the receiving node 130, an ACK time interval 320 indicates the time needed for the receiving node 130 to return the 802.11 ACK corresponding to the first unicast packet and for the access point 120 to process the 802.11 ACK packet.

Similarly, a second time interval 330 indicates the time needed for the access point 120 to convert the multicast packet received from the source node 110 into the second unicast packet and transmit the second unicast packet to the receiving node 140 at the second data rate, for example, 18 Mbps. A second ACK time interval 340 indicates the time needed for the receiving node 140 to return an 802.11 ACK corresponding to the second unicast packet and for the access point 120 to process the 802.11 ACK packet. In comparison, a multicast time interval 350 indicates the duration for the access point 120 to receive and transmit the multicast packet simultaneously to the receiving nodes 130 and 140 at either the lowest common denominator rate or the minimum allowable physical data rate.

Because the duration of the combined time intervals 310, 320, 330, and 340 is shorter than the duration of the multicast time interval 350, the system and method described herein advantageously achieve a higher data throughput by converting the multicast packet to sequential unicast packets. Further, as the duration of the time intervals 310 and 320 increases because of interference in the wireless links 135 and 145 (FIG. 1) leading to lower first and second data rates, for example, the combined duration of the time intervals 310, 320, 330, and 340 may exceed the multicast time interval 350. In such case, the lowest common denominator rate may provide a higher data rate than the minimum allowable data rate. Another advantage, therefore, is graceful degradation of the overall data transmission rate with changes in the wireless LAN.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated. The scope of the invention should, therefore, be determined not with reference to the above description, but instead should be determined with reference to the appended claims along with their full scope of equivalents.

What is claimed is:

1. A method for improving throughput in a communications network, the method comprising:
    receiving into an access point of the communications network a multicast packet from a source, wherein the access point maintains a list of stations to receive a multicast packet that has been converted into a unicast packet;
    converting the multicast packet into a unicast packet at the access point, the conversion taking place at the media access control layer, the converted multicast packet addressed to a station associated with the access point and identified on the list of stations to receive the converted packet; and
    transmitting the unicast packet over the communications network from the access point to the station, wherein the unicast packet is transmitted at a higher physical data rate than a corresponding multicast or broadcast packet.

2. The method of claim 1, wherein the communications network comprises an IEEE 802.11 wireless network.

3. The method of claim 1, wherein the multicast packet includes a user datagram protocol networking message.

4. The method of claim 1, wherein the multicast packet includes a multicast control packet.

5. The method of claim 1 further comprising:
    determining an antenna configuration on which to transmit to the station;
    determining a physical data rate at which to transmit to the station; and
    transmitting the unicast packet on the antenna configuration and at the physical data rate over a wireless network from the access point to the station.

6. The method of claim 1 further comprising:
    querying the station to determine an address of the station; and
    mapping an address of the multicast packet to the address of the station.

7. The method of claim 1 further comprising:
    transmitting a join request from the station to the source; and
    associating in the access point the station to an address of the multicast packet based on the join request.

8. The method of claim 1, further comprising retransmitting the unicast packet one or more times if an acknowledgment is not received.

9. A method for improving throughput in a communications network, the method comprising:
    receiving into an access point of the communications network a multicast packet from a source, wherein the access point maintains a list of stations to receive a multicast packet that has been converted into a unicast packet;
    determining a first physical data rate by which the access point may transmit the multicast packet to a first station associated with the access point;
    determining a second physical data rate by which the access point may transmit the multicast packet to a second station associated with the access point; and
    not transmitting the multicast packet to the first station and the second station if the transmission would not increase throughput in the communications network;
    converting the multicast packet into a first unicast packet at the media access control layer, the conversion taking place at the access point, the first unicast packet addressed to the first station and identified on the list of stations to receive the converted packet;
    converting the multicast packet into a second unicast packet at the media access control layer, the conversion taking place at the access point, the second unicast packet addressed to the second station and identified on the list of stations to receive the converted packet;
    transmitting the first unicast packet over the communications network from the access point to the first station; and
    transmitting the second unicast packet over the communications network from the access point to the second station, wherein the unicast packets are transmitted to the first station and the second station at a higher physical data rate than a corresponding multicast packet.

10. An access point for improving throughput in a communications network, the access point configured to:
    receive a multicast packet from a source, wherein the access point maintains a list of stations to receive a multicast packet that has been converted into a unicast packet;
    convert the multicast packet into a unicast packet addressed to a station associated with the access point and identified on the list of stations to receive the converted packet, the conversion taking place at the media access control layer; and
    transmit the unicast packet over the communications network from the access point to the station, wherein the unicast packet is transmitted at a higher data rate than a corresponding multicast packet.

11. The access point of claim 10 wherein the communications network comprises an IEEE 802.11 wireless network.

12. The access point of claim 10 further configured to:
    determine an antenna configuration on which to transmit to the station;
    determine a physical data rate at which to transmit to the station; and
    transmit the unicast packet on the antenna configuration and at the physical data rate over a wireless network from the access point to the station.

13. The access point of claim 10 further configured to:
    query the station to determine an address for the station; and
    map an address of the multicast packet to the address of the station.

14. The access point of claim 10 further configured to associate the station to an address of the multicast packet based on a join request transmitted from the station to the source.

* * * * *

UNITED STATES PATENT AND TRADEMARK OFFICE
CERTIFICATE OF CORRECTION

PATENT NO. : 7,505,447 B2 Page 1 of 1
APPLICATION NO. : 11/232196
DATED : March 17, 2009
INVENTOR(S) : William S. Kish, John Chanak and Charles Andrew Gram It is certified that error appears in the above-identified patent and that said Letters Patent is hereby corrected as shown below:

In column 3, line 26, the word "transit" should be changed to "transmit" and the specification should be corrected to read as follows:

...second rate by which the access point may "transmit" the multi-....

Signed and Sealed this

Twenty-ninth Day of September, 2009

David J. Kappos
*Director of the United States Patent and Trademark Office*